(12) United States Patent
Yoon (10) Patent No.: US 9,935,686 B2
(45) Date of Patent: Apr. 3, 2018

(54) METHOD OF PREVENTING PRIORITY INVERSION IN POWER LINE COMMUNICATION, RECORDING MEDIUM AND APPARATUS FOR PERFORMING THE SAME

(71) Applicant: Foundation of Soongsil University-Industry Cooperation, Seoul (KR)

(72) Inventor: Sung-guk Yoon, Seoul (KR)

(73) Assignee: FOUNDATION OF SOONGSIL UNIVERSITY-INDUSTRY COOPERATION, Seoul (KR)

( * ) Notice: Subject to any disclaimer, the term of this patent is extended or adjusted under 35 U.S.C. 154(b) by 0 days.

(21) Appl. No.: 15/282,059

(22) Filed: Sep. 30, 2016

(65) Prior Publication Data
US 2017/0099080 A1    Apr. 6, 2017

(30) Foreign Application Priority Data

Oct. 2, 2015  (KR) .................. 10-2015-0138896

(51) Int. Cl.
*H04B 3/00* (2006.01)
*H04B 3/54* (2006.01)
(Continued)

(52) U.S. Cl.
CPC ........... *H04B 3/544* (2013.01); *H04L 5/0048* (2013.01); *H04L 12/2803* (2013.01);
(Continued)

(58) Field of Classification Search
CPC ....... H04B 3/544; H04L 69/22; H04L 5/0048; H04L 12/2803; H04L 47/24; H04L 69/324
(Continued)

(56) References Cited

U.S. PATENT DOCUMENTS 7,826,466 B2 * 11/2010 Patella ................ H04B 3/54
370/412
2009/0154487 A1 * 6/2009 Ryan .................. H04L 12/4035
370/445
(Continued)

FOREIGN PATENT DOCUMENTS

KR    10-0750175 B1    8/2007
KR    10-2015-0087466 A    7/2015

*Primary Examiner* — Chieh M Fan
*Assistant Examiner* — Fitwi Hailegiorgis
(74) *Attorney, Agent, or Firm* — Novick, Kim & Lee, PLLC; Sang Ho Lee (57) ABSTRACT

A method of preventing priority inversion in power line communication includes generating a priority notification signal of each node in order to prioritize a packet transmitted by each of the nodes, decreasing carrier detection threshold value of a prioritization section in the priority notification signal of each of the nodes, increasing transmission power level of the prioritization section in the priority notification signal of each of the nodes, transmitting the priority notification signal generated by each of the nodes, prioritizing the nodes by comparing the prioritization sections of the priority notification signals, and preferentially transmitting a packet of a node with a higher priority. This can solve a priority inversion problem between signals in a network to safely transmit signals without collisions and latency.

18 Claims, 5 Drawing Sheets

(51) Int. Cl.
*H04L 12/851* (2013.01)
*H04L 5/00* (2006.01)
*H04L 12/28* (2006.01)
*H04L 29/06* (2006.01)
*H04L 29/08* (2006.01)

(52) U.S. Cl.
CPC .............. *H04L 47/24* (2013.01); *H04L 69/22* (2013.01); *H04L 69/324* (2013.01)

(58) Field of Classification Search
USPC .......................... 375/275; 370/235, 445, 412
See application file for complete search history.

(56) References Cited

U.S. PATENT DOCUMENTS

| | | | |
|---|---|---|---|
| 2010/0220593 A1* | 9/2010 | Fujiwara | H04L 47/10 370/235 |
| 2013/0297087 A1* | 11/2013 | Koster | H04Q 9/00 700/291 |
| 2014/0226497 A1 | 8/2014 | Ding et al. | |
| 2015/0180677 A1 | 6/2015 | Logvinov et al. | |
| 2015/0208441 A1 | 7/2015 | Yoo et al. | |

* cited by examiner

FIG. 1

Table 1  Priority Resolution Slots

| Priority | PRS0 | PRS1 |
|---|---|---|
| CAP3 | Tx | Tx |
| CAP2 | Tx | Listen |
| CAP1 | Listen | Tx if no Tx in PRS0 |
| CAP0 | Listen | Listen |

METHOD OF PREVENTING PRIORITY INVERSION IN POWER LINE COMMUNICATION, RECORDING MEDIUM AND APPARATUS FOR PERFORMING THE SAME

CROSS-REFERENCE TO RELATED APPLICATION

This application claims priority to and the benefit of Korean Patent Application No. 10-2015-0138896, filed on Oct. 2, 2015, the disclosure of which is incorporated herein by reference in its entirety.

BACKGROUND

1. Field of the Invention

The present invention relates to a method for preventing priority inversion in power line communication and a recording medium and apparatus for performing the same, and more particularly, to a priority inversion prevention method for preventing a malfunction that occurs when there are hidden nodes in power line communication and a recording medium and apparatus for performing the same.

2. Discussion of Related Art

Recently, power line communication (PLC) network technology is getting the spotlight as one of the communication network configuration methods for a home network. PLC network technology uses existing power lines that have been built and thus does not need additional separate wiring, unlike the Ethernet. Also, PLC network technology may easily cover even a basement or other places that are unreachable by radio wave signals, unlike the wireless communication methods.

PLC applies a prioritization technique to determine the order of data to be transmitted. However, the prioritization technique for PLC operates abnormally immediately after a packet collision occurs. Accordingly, the prioritization technique is also likely to operate abnormally when a hidden node is present in a network. Since hidden nodes cannot identify nodes with priorities higher than those of the hidden nodes themselves, the hidden nodes attempt transmission, and the transmission may collide with a packet of transmissions with a high priority. After the collision, all nodes in the network may compete with each other, and thus a node with a lower priority may complete a transmission earlier than a node with a higher priority.

When a hidden node is present in a network as described above, data transmission collisions may occur very frequently. Accordingly, an effective data transmission method is required, which can increase the performance of the prioritization technique even when there is a hidden node.

SUMMARY OF THE INVENTION

The present invention is directed to providing a method of preventing priority inversion in power line communication when there is a hidden node in a network.

The present invention is also directed to providing a recording medium having a computer program recorded thereon for performing the method of preventing priority inversion in power line communication.

The present invention is also directed to providing an apparatus for performing the method of preventing priority inversion in power line communication.

According to an aspect of the present invention, there is provided a method of preventing priority inversion in power line communication, the method including the following steps: (a) collecting a plurality of nodes, each of the plurality of the nodes capable of transmitting or receiving a packet; (b) generating a priority notification signal of each of the plurality of the nodes in order to prioritize the packet transmitted by each of the plurality of the nodes, each priority notification signal having a prioritization section; (c) adjusting the prioritization section in the priority notification signal of each of the plurality of the nodes; (d) transmitting the priority notification signal of each of the plurality of the nodes; (e) ranking priorities of the plurality of the nodes by comparing the prioritization sections thereof; and (f) transmitting the packets from the plurality of the nodes sequentially based on the priorities thereof.

In the method of the present invention, the prioritization section in the priority notification signal includes a priority resolution slot (PRS). Accordingly, the step (c) of adjusting the prioritization section in the priority notification signal of each of the plurality of the nodes includes adjusting one or more parameters of the PRS.

More specifically, the step (c) can be either to decrease carrier detection threshold value of the prioritization section, or to increase transmission power level of the prioritization section. Alternatively, the step (c) can include both decreasing carrier detection threshold value of the prioritization section and increasing transmission power level of the prioritization section. Moreover, in the method of the present invention, the plurality of the nodes include an electric vehicle (EV) and an electric vehicle supply equipment (EVSE), or include electronic units that transmit and receive data over a home network.

The generating of a priority notification signal of each of the plurality of the node in order to prioritize the packet transmitted by each of the plurality of the nodes may conform to a standard communication protocol. The standard communication protocol can be ISO/IEC 15118 protocol or IEC 61850 protocol.

According to another aspect of the present invention, there is provided a non-transitory computer-readable recording medium having recorded thereon a computer program for performing the method of preventing priority inversion in power line communication.

According to another aspect of the present invention, there is provided an apparatus for preventing priority inversion in power line communication of a network having a plurality of nodes, the apparatus including (i) a priority notification signal generator configured to generate a priority notification signal of each of the nodes in order to prioritize a packet transmitted by each of the nodes; (ii) an adjustment unit configured to adjust the prioritization section in the priority notification signal of each of the plurality of the nodes; (iii) a priority notification signal transceiver configured to transmit a priority notification signal generated by one of the nodes and receive a priority notification signal generated by another node; and (iv) a packet transmitter configured to rank priorities of the plurality of the nodes by comparing the prioritization sections thereof, preferentially transmit a packet of a node with a higher priority, and suspend packet transmission of a node with a lower priority until the packet transmission of the node with the high priority is complete.

In the apparatus of the present invention, the prioritization section in the priority notification signal contains a PRS, and the adjustment unit is configured to adjust one or more parameters of the PRS.

Specifically, the adjustment unit can be a carrier detection threshold value adjustment unit configured to decrease carrier detection threshold value of the prioritization section or can be a transmission power level adjustment unit configured to increase transmission power level of the prioritization section, or can be both.

In this apparatus, the priority notification signal generator may generate the priority notification signal according to a standard communication protocol.

As discussed above, the nodes can be each one of an electric vehicle (EV) and an electric vehicle supply equipment (EVSE). The notes can also be electronic units that transmit and receive data over a home network.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

The following detailed description refers to the accompanying drawings that illustrate exemplary embodiments consistent with the present invention. These embodiments will be described in sufficient detail to enable those skilled in the art to practice the present invention. It is to be understood that the various embodiments of the present invention, although different, are not necessarily mutually exclusive. For example, a particular feature, structure or characteristic described herein in connection with one embodiment may be implemented within other embodiments without departing from the spirit and scope of the present invention. In addition, it is to be understood that the location or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar elements throughout the several views.

Hereinafter, preferred embodiments of the present invention will be described in more detail with reference to the accompanying drawings.

The present invention relates to a method of preventing a malfunction of prioritization that may occur when hidden nodes are in power line communication. Through the prioritization technique in power line communication, nodes with lower priorities suspend transmission until the transmission of nodes with high priorities is complete.

However, when a hidden node is present in a network, the presence of a node with a high priority cannot be identified. Thus, even nodes with low priorities may participate in competition for signal transmission, resulting in priority inversion.

The present invention proposes a method of performing normal prioritization by adjusting the transmission power level or the carrier detection threshold value in the prioritization method. Accordingly, the carrier detection or carrier detection threshold in actual data packet transmission subsequent to the prioritization is not changed. The proposed method may enable the prioritization technique to operate normally and prevent priority inversion.

Figure 1:
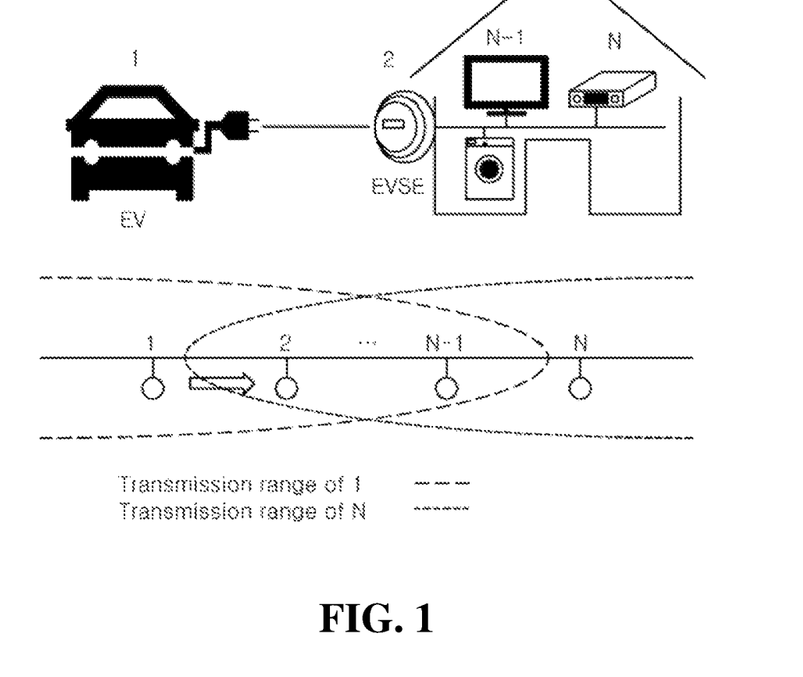
FIG. 1 is a conceptual diagram for describing priority inversion in power line communication.
Figure 2:
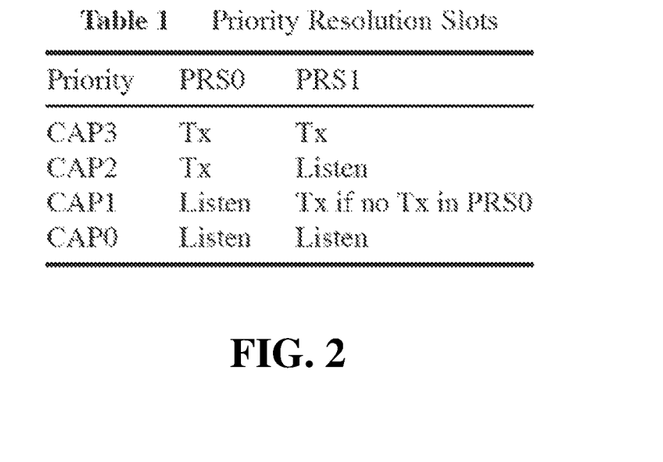
FIG. 2 is a table for prioritization in power line communication.
Figure 3:
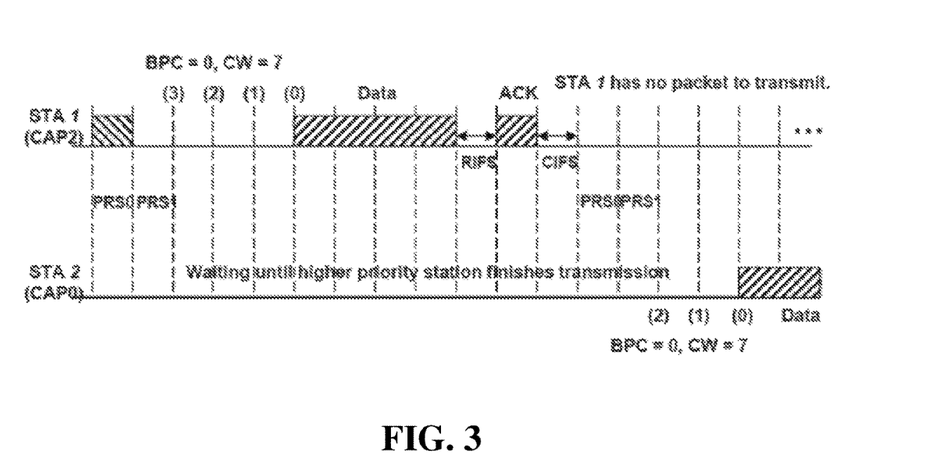
FIG. 3 shows an example of signal transmission for describing priority transmission in power line communication.
Figure 4:
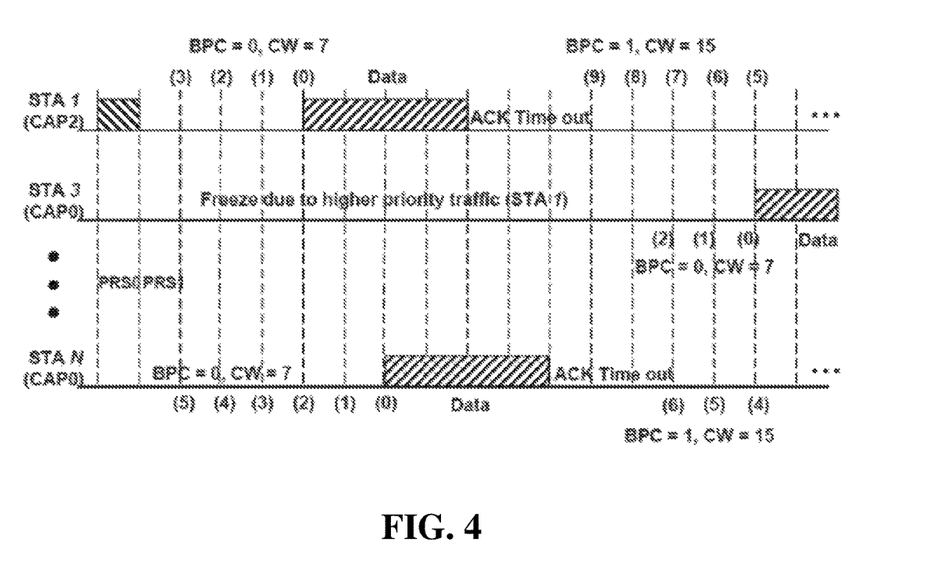
FIG. 4 shows an example of signal transmission for describing priority inversion in power line communication.

FIG. 1 is a conceptual diagram for describing priority inversion in power line communication. FIG. 2 is a table for prioritization in power line communication. FIG. 3 shows an example of signal transmission for describing priority transmission in power line communication. FIG. 4 shows an example of signal transmission for describing priority inversion in power line communication.

Many countries including South Korea are actively supporting the development and spread of an electric vehicle (EV), which is one of the applications for a smart grid. An electric vehicle driven by using electricity, a pollution-free power source, does not produce carbon monoxide (CO) and carbon dioxide ($CO_2$) and thus is effective in decreasing air pollution and ozone depletion. Besides, an electric vehicle is expect to help maximize the use of renewable energy and balance power load in conjunction with a smart grid for energy efficiency optimization.

FIG. 1 is a schematic configuration diagram of electric vehicle charging infrastructure, which shows a relationship between an electric vehicle (EV) and an electric vehicle supply equipment (EVSE). The EVSE supplies power to the EV in conjunction with a distributed generation system.

Also, a home network includes other electronic products, which are represented as nodes (or stations) 1, 2, . . . , N−1, N that transmit and receive data over the home network.

Since the EV and the EVSE are physically connected through a power line, power line communication (PLC) is selected as a standard power line communication technology. For example, an EVSE 2 may deliver information collected from the EV to an infrastructure operating system using ISO/IEC 15118 protocol or may deliver real-time power information received through IEC 61850 protocol to the EV.

Communication between the EV and the EVSE needs high reliability and low latency. Thus, the media access control (MAC) layer conforming to HomePlug Green PHY Specification among ISO/IEC 15118 defines a prioritization method that classifies traffic into four priority classes, which are called channel access priorities (CAPs) and confers an advantage to high-priority traffic. Through the prioritization method, a packet generated from the EV and the EVSE may have a higher priority than those of other PLC stations.

The prioritization technique for power line communication has a prioritization section in order to prioritize packets. Through this section, nodes with low priorities may recognize the presence of nodes with high priorities and suspend transmission until transmission of the nodes with high priorities is complete. The prioritization technique is defined in standards such as IEEE 1901, HomePlug AV, HomePlug AV2, HomePlug Green PHY, etc.

HomePlug Green PHY (HomePlug GP) Release Version 1.1 is a standard for a smart grid application such as Advanced Metering Infrastructure (AMI) and Vehicle-to-Grid (V2G), which is released in 2012 by the HomePlug Alliance. HomePlug GP is compatible with other broadband PLC standards such as HomePlug AV2 and IEEE 1901 by using a frequency band (1.8 to 30 MHz) that is the same as the other standards. HomePlug GP simplifies a previous broadband PLC standard, thus decreasing complexity and cost.

A priority resolution method operates in a CSMA/CA region in which a priority is assigned to each packet. In a home network, HomePlug GP may assign a higher priority to V2G traffic than to the general traffic. A prioritization method is provided by the prioritization section, which is composed of two priority resolution slots PRS0 and PRS1 (hereinafter referred to as PRS). Since one bit of information is represented in each PRS, whether there is a signal or not is classified into four CAPs. CAP3 and CAP0 are the highest priority and the lowest priority, respectively. Referring to FIG. 2, there is a table showing the use of PRSs for each CAP.

After the prioritization section, each station acquires information regarding the presence of packets with priorities higher than that of the station. When there is any high-priority traffic, the station does not participate in the next channel access.

FIG. 3 is a diagram showing an example of the prioritization. First station STA 1 and second station STA 2 have CAP2 and CAP0, respectively. A new channel access is started by two PRSs. First station STA1 transmits a signal to PRS0, and second station STA 2 receives a signal from PRS0. Next, second station STA 2 recognizes the presence of a packet with a higher priority and waits until the packet is transmitted. After the packet transmission, ACK frame transmission is performed according to a response interframe spacing (RIFS). Subsequently, the next channel access is started after a contention interframe space (CIFS).

However, the prioritization technique for PLC is likely to operate abnormally when a hidden node is present in a network. Since hidden nodes cannot identify nodes with priorities higher than the hidden nodes, the hidden nodes attempt transmission. Thus, the transmission may collide with transmission of a packet with a high priority. After the collision, all nodes in the network may participate in a competition, causing an error in which a node with a low priority performs transmission earlier than a node with a high priority.

In FIG. 1, a region indicated by a long-dashed line represents a signal transmission region of a first node 1, and a region indicated by a short-dashed line represents a signal transmission region of an $N_{th}$ node N. As shown in FIG. 1, the first node 1 is located outside of a communication cell region of the $N_{th}$ node N, and the $N_{th}$ node N is located outside of a communication cell region of the first node 1. Accordingly, the first node 1 and the $N_{th}$ node N cannot recognize communication status of each other.

Accordingly, the $N_{th}$ node N is a hidden node in the situation of the first node 1, and the first node 1 is a hidden node in the situation of the $N_{th}$ node N. The mutual hidden-node relationship causes data transmission collision, that is, a hidden node problem when the first node 1 and the $N_{th}$ node N attempt to transmit data to a coordinator or another node at the same time.

When the first node 1 and the $N_{th}$ node N, which are in the mutually hidden node relationship, transmit data to a coordinator, and a collision therebetween occurs, Automatic Repeat Request (ARQ) mechanism works to achieve data retransmission and thus reduce data throughput.

When a hidden node is present in a network, data transmission collisions may occur very frequently. In some cases, the frequent data transmission collisions may cause reduction in data throughput by about 30% to about 40%. Accordingly, a method of solving the hidden node problem is required.

FIG. 4 shows an example of priority inversion of topology of FIG. 1. When a new channel access is started, first station STA1 silences stations other than $N_{th}$ station STA N through the prioritization method. Since $N_{th}$ station STA N cannot detect signal PRS0 of first station STA1, $N_{th}$ station STA N participates in the channel access. As a result, a signal collision occurs, and all stations participate in the next competition. In the competition, third station STA 3 selects the smallest BC and successfully transmits packets, that is, priority inversion occurs because there is no hidden station.

Transmission between the EV and EVSE has a high priority. The EVSE may be implemented as a smart meter, and transmission of the EVSE may arrive at all stations in the network. Accordingly, there is no hidden station, thus preventing the occurrence of priority inversion. Risk of the priority inversion is an issue for transmission in the EV.

The priority inversion causes a malfunction of CSMA/CA protocol and thus should be avoided. The priority inversion increases latency of a packet with a high priority. In the worst case, the priority inversion causes continuous collisions of packets with high priorities, which occur frequently due to the hidden node problem. In this case, the same control packet results in serious latency, e.g., several seconds and is delivered to the MAC layer after TCP timeout.

The reason of priority inversion is an asymmetric prioritization range. That is, the reason is that all stations with low priorities in a transmission range of a sender keep silent as the prioritization method while some of the stations with low priorities are not located in a transmission range of a receiving end.

The present invention proposes two priority inversion prevention methods in order to prevent a priority inversion case. A key concept of the method proposed by the present invention is to protect a receiving end using asymmetry of transmission power level and carrier detection threshold value. In other words, since the priority inversion generally corresponds to a collision at a receiving side, the method proposed by the present invention increases transmission distance of a priority notification signal in order to protect even the receiving end.

One method is a method of increasing the distance by increasing the transmission power, and the second method is a method of increasing the distance by decreasing the carrier detection threshold. The present invention proposes a method of performing normal prioritization by adjusting the transmission power level or the carrier detection threshold value of the prioritization method. Accordingly, the transmission power level or the carrier detection threshold value in actual data packet transmission subsequent to the prioritization is not changed.

First, the method of increasing the distance by increasing the transmission power level will be described.

Figure 5:
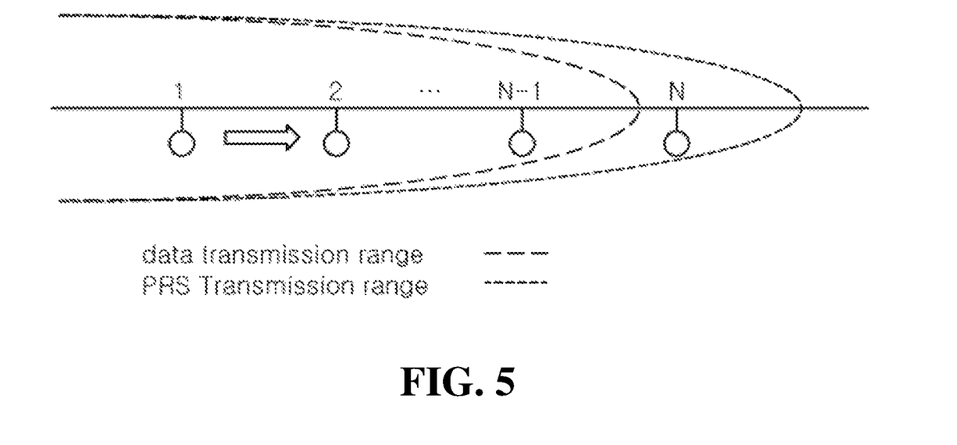
FIG. 5 is a conceptual diagram for describing prevention of priority inversion in power line communication according to an embodiment of the present invention.

One solution to protect a receiving end is to use higher PRS transmission power, which is shown in FIG. 5.

Referring to FIG. 5, by using higher PRS power, all stations (e.g., $N_{th}$ station STA N of FIG. 1) located in a transmission range of a receiver keep silent. Accordingly, packets with high priorities may be delivered without interference.

For example, in the IEEE 1901 and HomePlug GP specification, the physical carrier detection threshold value $P_{thresh}$ and the transmission power level $P_{tx}$ are −35 dBm and 24 dBm, respectively. As the distance between a transmitter and a receiver increases and the channel attenuation increases, a simplified channel model is defined by Equation 1 below:

$$\mu(f,D)=(0.0034D+1.0893)f+0.1295D \quad \text{[Equation 1]}$$

where f is frequency in MHz and D is distance in meters. The channel attenuation and the Power $P_{rx,h}$ provided to the station in the home network are defined by Equation 2 below:

$$P_{rx,h}=P_{tx}-\mu(f,D)-SP_{loss} \quad \text{[Equation 2]}$$

where $SP_{loss}$ is service panel loss, for example, 50 dB. In order to accurately detect the presence of a station with a higher priority, the provided power $P_{rx,h}$ should be higher than the career detection threshold value $P_{thresh}$.

Since the priority inversion generally corresponds to a collision at a receiving side, the method proposed by the present invention increases transmission distance of a priority notification signal and can be sent in order to protect even the receiving end. On the basis of Equation 1 and Equation 2, transmission distance of a priority notification signal of each station increases by increasing PRS transmission power level $P_{tx}$ in the priority notification signal.

For example, when the frequency f is 5 MHz and the maximum PRS detection range of the home network is 26.7 m, the method may increase a proposed transmission power level $P_{tx}^{PRS}$ to 28.3 dBm to increase the PRS detection range of the home network by a factor of two (i.e., 53.4 m).

Figure 6:
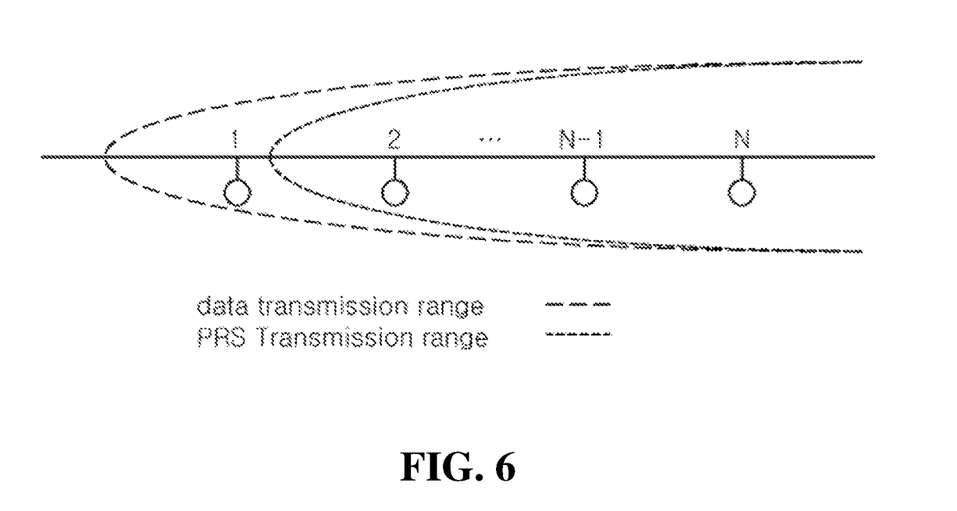
FIG. 6 is a conceptual diagram for describing prevention of priority inversion in power line communication according to another embodiment of the present invention.

As another embodiment of the present invention, the carrier detection threshold value is decreased to detect a PRS.

Referring to FIG. 6, according to the decreased carrier detection threshold value, $N_{th}$ station STA N may detect a PRS signal of first station STA 1. When the carrier detection threshold value $P_{thresh}$ and the transmission power level $P_{tx}$ have default values, the maximum PRS detection range is 26.7 m. According to an embodiment of the present invention, when the physical carrier detection threshold value $P_{thresh}^{PRS}$ is decreased to −39.3 dBm, the PRS detection range may increase by a factor of two (i.e., 53.4 m) according to Equation 1 and Equation 2.

In this way, the carrier detection threshold value $P_{thresh}$ and the transmission power level $P_{tx}$ provide exactly the same result. The method of adjusting the transmission power level $P_{tx}$ may be limited according to electromagnetic compatibility regulations. Thus, the increased PRS carrier detection threshold $P_{thresh}$ may be adjusted according to the regulations.

The adjustment of the carrier detection threshold value $P_{thresh}$ and the transmission power level $P_{tx}$ proposed by the present invention may be realistically and simply performed. That is, only one parameter may be changed and then applied to a PLC station that was already installed through a firmware update.

As described above, the present invention has proposed two methods for solving the hidden station problem, that is, the method of adjusting PRS carrier detection threshold value $P_{thresh}$ and the method of adjusting PRS transmission power level. However, one or both of the two methods may be used. That is, the scheme proposed by the present invention is not limited to discrimination between priorities. This is because the proposed method enlarges the PRS detection range and does not affect any prioritization function.

For example, when there are three stations with priorities of CAP3, CAP2, and CAP0 and two stations are in a hidden relationship, packets are delivered in the order of priorities according to the proposed scheme. However, when there is no priority prevention scheme proposed, the packets are delivered in any order.

Accordingly, important packets can be transmitted at high speed and without any loss through the priority inversion prevention method proposed by the present invention, thus guaranteeing smooth operations of critical applications.

Figure 7:
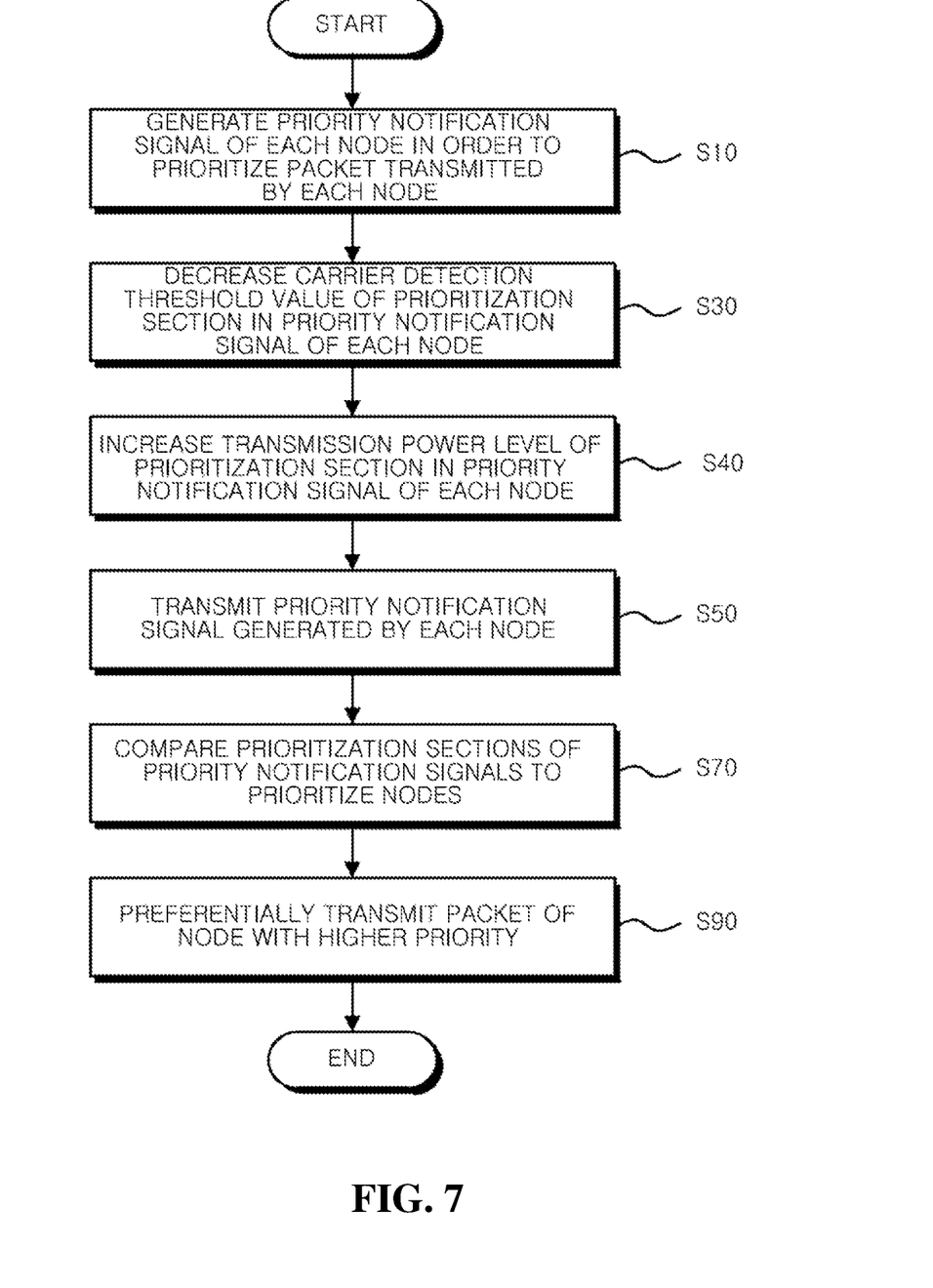
FIG. 7 is a flowchart of a method of preventing priority inversion in power line communication according to an embodiment of the present invention.

The above-described method of preventing priority inversion in power line communication will be described below sequentially with reference to FIG. 7. FIG. 7 is a flowchart of the method of preventing priority inversion in power line communication according to an embodiment of the present invention.

Referring to FIG. 7, the method of preventing priority inversion in power line communication according to this embodiment includes generating a priority notification signal of each node in order to prioritize a packet transmitted by each of the nodes (step S10).

The priority notification signal of each of the nodes may be generated according to a standard communication protocol, for example, ISO/IEC 15118. A prioritization section composed of priority resolution slots (PRSs) is present in the priority notification signals.

The method includes decreasing carrier detection threshold value of the prioritization section in the priority notification signal of each of the nodes for the purpose of prioritization (step S30).

Transmission distance of the priority notification signal increases by increasing PRS transmission power level $P_{tx}$ of the priority notification signal of each of the nodes. For example, when the frequency f is 5 MHz, and the maximum PRS detection range of the home network is 26.7 m, the PRS detection range of the home network increases by a factor of two (i.e., 53.4 m), by increasing proposed transmission power level $P_{tx}^{PRS}$ to 28.3 dBm.

Meanwhile, the method may include increasing transmission power level of the prioritization section in the priority notification signal of each of the nodes (step S40).

According to the decreased carrier detection threshold value, $N_{th}$ station STA N may detect a PRS signal of first station STA 1. When the carrier detection threshold value $P_{thresh}$ and the transmission power level $P_{tx}$ have default values, the maximum PRS detection range is 26.7 m. According to an embodiment of the present invention, when the physical carrier detection threshold value $P_{thresh}^{PRS}$ is decreased to −39.3 dBm, the PRS detection range may increase by a factor of two (i.e., 53.4 m).

In this way, the adjustment of the carrier detection threshold value $P_{thresh}$ and the transmission power level $P_{tx}$ provide exactly the same result. The adjustment of the carrier detection threshold value $P_{thresh}$ and the transmission power level $P_{tx}$ proposed by the present invention may be realistically and simply performed. That is, only one parameter may be changed and then applied to a PLC station that was already installed through a firmware update.

As described above, the present invention has proposed the method of adjusting a PRS carrier detection threshold value $P_{thresh}$ (step S30) and the method of adjusting a PRS transmission power level (step S40) in order to solve the hidden station problem. However, one or both of the two methods may be performed.

The method includes adjusting a parameter of the prioritization section of the generated priority notification signal and then transmitting the priority notification signal generated by each of the nodes (step S50). By adjusting parameters of the carrier detection threshold value $P_{thresh}$ and the transmission power level $P_{tx}$, transmission distance or reception distance of the priority notification signal increases. Accordingly, the occurrence of a hidden node is prevented.

The method includes comparing the prioritization sections of the generated priority notification signals to prioritize the nodes (step S70). In this case, a table mapping the priorities according to the PRS may be used.

The method includes preferentially transmitting a packet of a node with a higher priority when the prioritization is performed (step S90). On the other hand, when another node with a higher priority is detected, the node suspends packet transmission and waits until packet transmission of the other node is complete.

The present invention proposes a method of performing normal prioritization by adjusting the transmission power level or the carrier detection threshold value in the prioritization method. Accordingly, the transmission power level or the carrier detection threshold value in actual data packet transmission subsequent to the prioritization is not changed.

As described above, the method of preventing priority inversion in power line communication may be implemented as an application or implemented in the form of program instructions that may be executed through various computer components and recorded on a computer-readable recording medium. The computer-readable recording medium may include program instructions, data files, data structures, and the like individually or in combination.

The program instructions recorded on the computer-readable recording medium may be specifically designed for the present invention or may be well-known to and used by those skilled in the art of computer software.

Examples of the computer-readable recording medium include a magnetic medium such as a hard disk, a floppy disk, or a magnetic tape, an optical medium such as a compact disc-read only memory (CD-ROM) or a digital versatile disc (DVD), a magneto-optical medium such as a floptical disk, and a hardware device such as ROM, a random access memory (RAM), or a flash memory that is specially designed to store and execute program instructions.

Examples of the program instructions include not only machine code generated by a compiler or the like but also high-level language codes that may be executed by a computer using an interpreter or the like. The hardware device may be configured to operate as one or more software modules in order to perform operations of the present invention, and vice versa.

Figure 8:
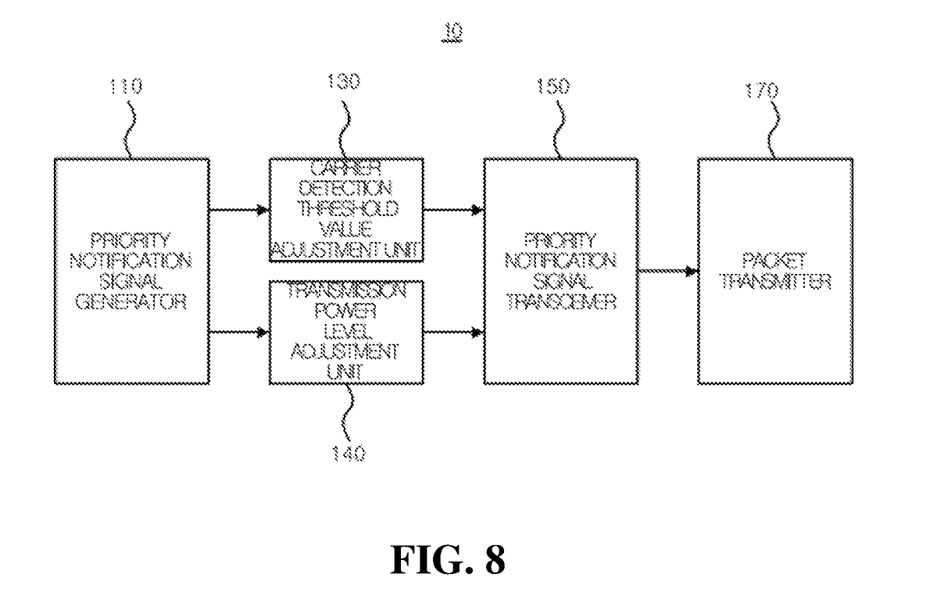
FIG. 8 is a block diagram of an apparatus for preventing priority inversion in power line communication according to an embodiment.

FIG. 8 is a block diagram of an apparatus for preventing priority inversion in power line communication according to an embodiment.

In the power line communication according to the present invention, a priority inversion prevention apparatus 10 (hereinafter referred to as an apparatus) is an apparatus for preventing a malfunction of prioritization that may occur when there are hidden nodes. The apparatus 10 may be formed inside each node (or station) in a power line communication network or connected with each node (or station) through an interface.

Referring to FIG. 8, the apparatus 10 according to the present invention includes a priority notification signal generator 110, a carrier detection threshold value adjustment unit 130, a priority notification signal transceiver 150, and a packet transmitter 170. The apparatus 10 may further include a transmission power level adjustment unit 140.

In the apparatus 10 according to the present invention, software (an application) for preventing priority inversion in power line communication may be installed and executed. The priority notification signal generator 110, the carrier detection threshold value adjustment unit 130, the transmission power level adjustment unit 140, the priority notification signal transceiver 150, and the packet transmitter 170 may be controlled by the software for preventing priority inversion in power line communication.

The apparatus 10 may be a separate terminal or a module of the terminal. Also, the priority notification signal generator 110, the carrier detection threshold value adjustment unit 130, the transmission power level adjustment unit 140, the priority notification signal transceiver 150, and the packet transmitter 170 may be configured as an integrated module or implemented as one or more modules. On the other hand, the elements may be implemented as separate modules.

The apparatus 10 may have mobility or be fixed. The apparatus 10 may be in the form of a module, a server, or an engine and may be referred to by other terms such as a device, a terminal, a user equipment (UE), a mobile station (MS), a wireless device, a handheld device, etc.

The priority notification signal generator 110 generates a priority notification signal of each node in order to prioritize priorities of packets sent by the node. The priority notification signal of each node may be generated according to a standard communication protocol, for example, ISO/IEC 15118. A prioritization section composed of priority resolution slots (PRSs) is present in the priority notification signals.

The carrier detection threshold value adjustment unit 130 decreases carrier detection threshold value of the prioritization section in the priority notification signal of the node.

The carrier detection threshold value adjustment unit 130 increases transmission distance of the priority notification signal by increasing PRS transmission power level $P_{tx}$ of the priority notification signal of each node. For example, when the frequency f is 5 MHz, and the maximum PRS detection range of the home network is 26.7 m, the carrier detection threshold value adjustment unit 130 may increase a proposed transmission power level $P_{tx}^{PRS}$ to 28.3 dBm to increase the PRS detection range of the home network by a factor of two (i.e., 53.4 m).

The transmission power level adjustment unit 140 increases the transmission power level of the prioritization section in the priority notification signal of each node. According to the decreased carrier detection threshold value, $N_{th}$ station STA N may detect a PRS signal of first station STA 1. When the carrier detection threshold value $P_{thresh}$ and the transmission power level $P_{tx}$ have default values, the maximum PRS detection range is 26.7 m. According to an embodiment of the present invention, when the physical carrier detection threshold value $P_{thresh}^{PRS}$ is decreased to −39.3 dBm, the PRS detection range may increase by a factor of two (that is, 53.4 m).

Only one or both of the carrier detection threshold value adjustment unit 130 and the transmission power level adjustment unit 140 may operate.

The priority notification signal transceiver 150 adjusts a parameter of the prioritization section of the generated priority notification signal and then transmits the priority notification signal generated by each node. By adjusting parameters of the carrier detection threshold value $P_{thresh}$ and the transmission power level $P_{tx}$, transmission distance or reception distance of the priority notification signal increases. Accordingly, the occurrence of a hidden node among nodes is prevented.

Also, the priority notification signal transceiver 150 receives a priority notification signal transmitted by another node.

The packet transmitter 170 compares its own prioritization section and a prioritization section of the received priority notification signal to perform prioritization. In this case, the packet transmitter 170 may use a table mapping the priorities according to the PRS.

When a prioritization is performed and a higher priority is assigned, the packet transmitter 170 preferentially transmits its own packets. On the other hand, when another node with a higher priority is detected, the node suspends packet transmission and waits until the other node completes packet transmission.

The present invention proposes a method of performing normal prioritization by adjusting the transmission power level or the carrier detection threshold value in the prioritization method. Accordingly, the transmission power level or the carrier detection threshold value in actual data packet transmission subsequent to the prioritization is not changed.

For grid communication, many automotive vendors select the use of HomePlug GP in a vehicle. Since HomePlug GP uses the same frequency band as another broadband PLC standard, the two standards share a power line channel through a CSMA/CA protocol. HomePlug GP may provide a priority to each packet, and the packet generated from an electric vehicle (EV) may have a higher priority than other general data packets. However, when a power line communication station is hidden in the electric vehicle (EV), a packet generated from the electric vehicle EV cannot always obtain a higher priority. That is, a priority inversion problem occurs.

The present invention proposes a solution for solving the priority inversion problem in an electric vehicle (EV) scenario. By preventing priority inversion in power line communication, it is possible to solve the priority inversion problem and also enhance performance of all packets irrespective of whether the packets have a high or low priority. Furthermore, it is also possible to reduce latency probability and packet drop probability of low-priority traffic to about 41% and about 91%, respectively.

According to the method of preventing priority inversion in power line communication, it is possible to transmit packets while preventing a collision between packets with difference priorities. Accordingly, important packets can be transmitted at high speed and without any loss, and thus a smooth operation of critical applications can be guaranteed. For example, when a standard communication protocol is applied for the charging of an electric vehicle according to an international standard, a packet associated with payment for the charging of an electric vehicle can be transmitted quickly and safely by increasing priority of the packet. Furthermore, a signal transmission system between all electronic devices in power line communication may be stabilized.

Although the present invention has been described with reference to exemplary embodiments, it will be understood that various changes and modifications may be made herein without departing from the scope and spirit of the present invention defined in the appended claims.

INDUSTRIAL APPLICABILITY

The present invention relates to a method of preventing a malfunction of a prioritization technique when hidden nodes are present in power line communication, thus enabling a normal operation of the prioritization technique and preventing a priority inversion problem. Thus, the present invention may be used as a standard patent by participating in standardization for power line communication.

The invention claimed is:

1. A method of preventing priority inversion in power line communication, the method comprising:
    collecting a plurality of nodes, each of the plurality of the nodes capable of transmitting or receiving a packet;
    generating a priority notification signal of each of the plurality of the nodes in order to prioritize the packet transmitted by each of the plurality of the nodes, each priority notification signal having a prioritization section;
    adjusting the prioritization section in the priority notification signal of each of the plurality of the nodes;
    transmitting the priority notification signal of each of the plurality of the nodes;
    ranking priorities of the plurality of the nodes by comparing the prioritization sections thereof; and
    transmitting the packets from the plurality of the nodes sequentially based on the priorities thereof,
    wherein the prioritization section in the priority notification signal comprises a priority resolution slot (PRS), and
    wherein the adjusting the prioritization section in the priority notification signal of each of the plurality of the nodes comprises adjusting one or more parameters of the PRS by decreasing carrier detection threshold value of the prioritization section.

2. The method of claim 1, wherein the adjusting the one or more parameters of the PRS further comprises increasing transmission power level of the prioritization section.

3. The method of claim 1, wherein the adjusting the one or more parameters of the PRS comprises decreasing the carrier detection threshold value of the prioritization section and increasing transmission power level of the prioritization section.

4. The method of claim 1, wherein the plurality of the nodes comprise an electric vehicle (EV) and an electric vehicle supply equipment (EVSE).

5. The method of claim 1, wherein the plurality of the nodes comprise electronic units that transmit and receive data over a home network.

6. The method of claim 1, wherein the generating a priority notification signal of each of the plurality of the nodes in order to prioritize the packet transmitted by each of the plurality of the nodes conforms to a standard communication protocol.

7. A non-transitory computer-readable recording medium having, recorded thereon, a computer program for performing the method of preventing priority inversion in power line communication of any one of claim 1.

8. An apparatus for preventing priority inversion in power line communication of a network having a plurality of nodes, the apparatus comprising:
    a priority notification signal generator configured to generate a priority notification signal of each of the plurality of the nodes in order to prioritize the packet transmitted by each of the plurality of the nodes, each priority notification signal having a prioritization section;

an adjustment unit configured to adjust the prioritization section in the priority notification signal of each of the plurality of the nodes;

a priority notification signal transceiver configured to transmit the priority notification signal generated by one of the plurality of the nodes and receive a priority notification signal generated by another node; and a packet transmitter configured to rank priorities of the plurality of the nodes by comparing the prioritization sections thereof, preferentially transmit a packet of a node with a higher priority, and suspend packet transmission of a node with a lower priority until the packet transmission of the node with the high priority is complete, wherein the prioritization section in the priority notification signal comprises a PRS, wherein the adjustment unit is configured to adjust one or more parameters of the PRS, and wherein the adjustment unit comprises a carrier detection threshold value adjustment unit configured to decrease carrier detection threshold value of the prioritization section.

9. The apparatus of claim 8, wherein the adjustment unit further comprises a transmission power level adjustment unit configured to increase transmission power level of the prioritization section.

10. The apparatus of claim 8, wherein the adjustment unit comprises the carrier detection threshold value adjustment unit configured to decrease the carrier detection threshold value of the prioritization section and a transmission power level adjustment unit configured to increase transmission power level of the prioritization section.

11. The apparatus of claim 8, wherein the plurality of the nodes comprise an EV and an EVSE.

12. The apparatus of claim 8, wherein the plurality of the nodes comprise electronic units that transmit and receive data over a home network.

13. A method of preventing priority inversion in power line communication, the method comprising:

collecting a plurality of nodes, each of the plurality of the nodes capable of transmitting or receiving a packet;

generating a priority notification signal of each of the plurality of the nodes in order to prioritize the packet transmitted by each of the plurality of the nodes, each priority notification signal having a prioritization section;

adjusting the prioritization section in the priority notification signal of each of the plurality of the nodes;

transmitting the priority notification signal of each of the plurality of the nodes;

ranking priorities of the plurality of the nodes by comparing the prioritization sections thereof; and transmitting the packets from the plurality of the nodes sequentially based on the priorities thereof, wherein the prioritization section in the priority notification signal comprises a priority resolution slot (PRS), and wherein the adjusting the prioritization section in the priority notification signal of each of the plurality of the nodes comprises adjusting one or more parameters of the PRS by increasing transmission power level of the prioritization section.

14. The method of claim 13, wherein the adjusting one or more parameters of the PRS further comprises adjusting the one or more parameters of the PRS by decreasing carrier detection threshold value of the prioritization section.

15. The method of claim 13, wherein the adjusting the one or more parameters of the PRS comprises decreasing carrier detection threshold value of the prioritization section and increasing the transmission power level of the prioritization section.

16. The method of claim 13, wherein the plurality of the nodes comprise an electric vehicle (EV) and an electric vehicle supply equipment (EVSE).

17. The method of claim 13, wherein the plurality of the nodes comprise electronic units that transmit and receive data over a home network.

18. The method of claim 13, wherein the generating a priority notification signal of each of the plurality of the nodes in order to prioritize the packet transmitted by each of the plurality of the nodes conforms to a standard communication protocol.

* * * * *